Patented Oct. 7, 1947

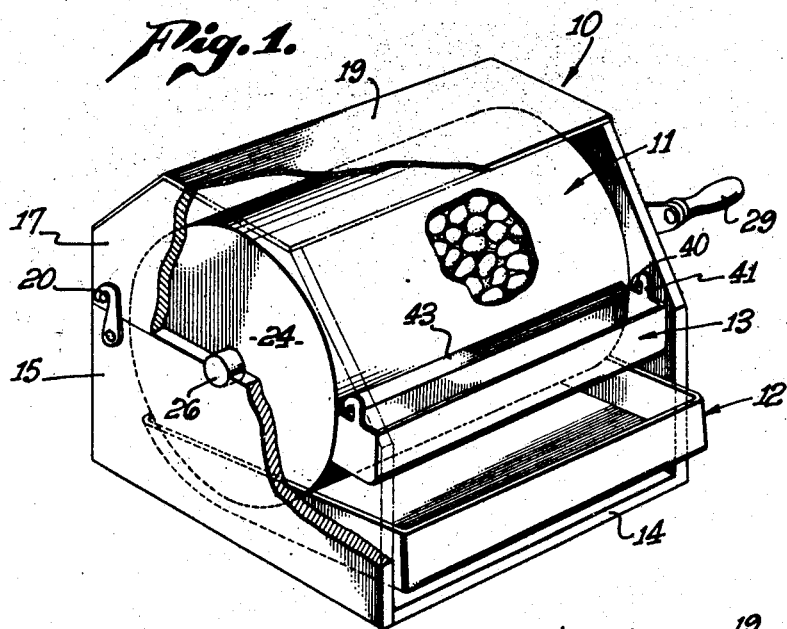
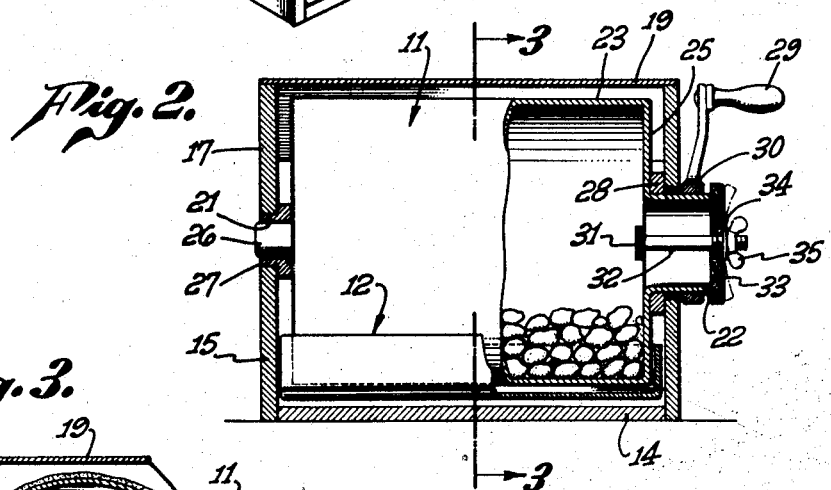
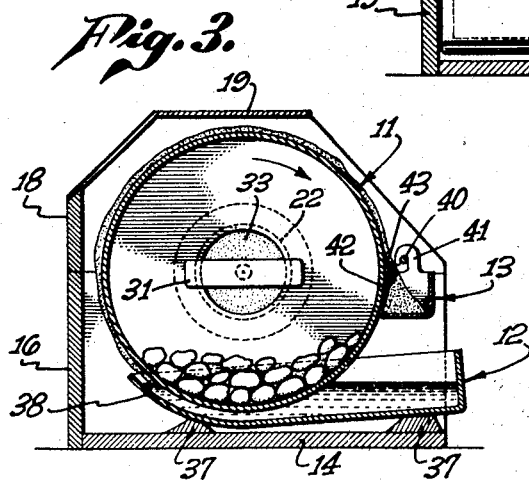

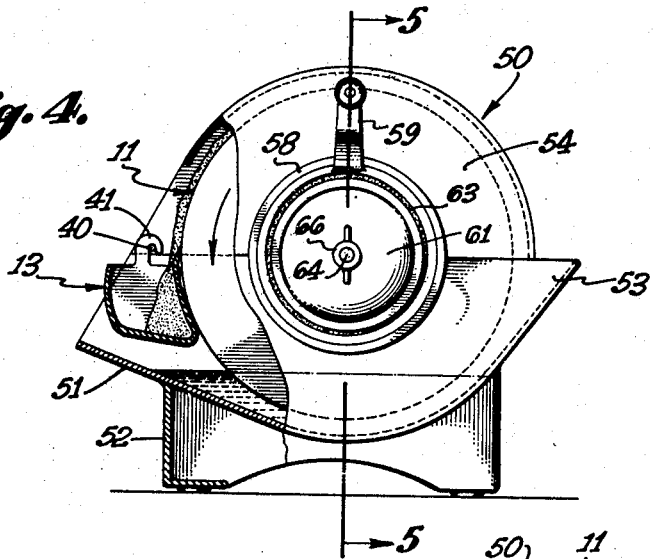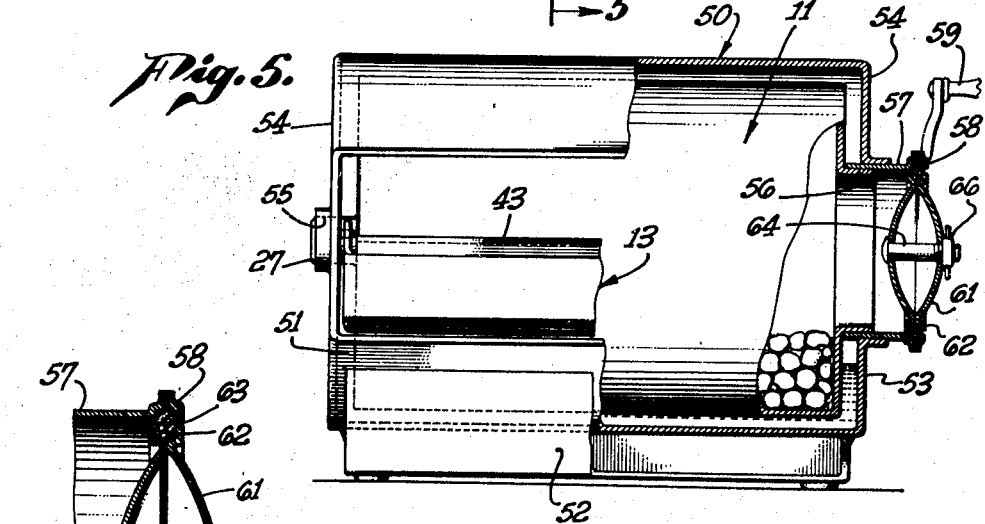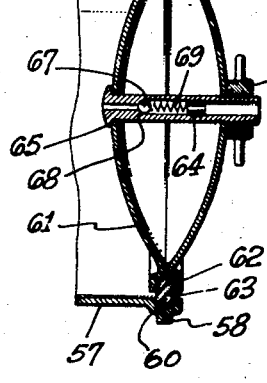

2,428,736

UNITED STATES PATENT OFFICE 2,428,736

QUICK-FREEZE DEVICE

Lyle J. Casmire, Los Angeles, Calif.

Application August 12, 1944, Serial No. 549,198

11 Claims. (Cl. 62—114)

My invention relates to refrigerating devices, and has more particular reference to quick freeze devices useful in making ice creams, sherbets, frozen beverages, and the like.

It has been proposed to freeze water, and water containing liquids, by supplying the liquid to a moving freezing surface, and then scraping or cutting the resultant frozen material from the surface. Such prior proposals contemplate the circulation of a fluid refrigerant or the utilization of brine as a secondary refrigerant, and have necessitated the employment of costly power driven equipment or heavy brine containing devices that are unsuited for domestic use or for use on aircraft and other vehicles. The pumping of refrigerants requires the installation of power driven pumps or compressors, and the storage, or containing of a sufficient quantity of brine to serve as a secondary refrigerant, makes the mechanism heavy and bulky. Such factors have deterred the development and widespread adoption of this class of refrigerating device.

It is a general object of the invention to provide a simple, practical unit for the rapid freezing of ice cream, ices, frozen beverages, etc., which is compact, light in weight, and entirely self-contained. The device of the present invention may be in the form of a small, light-weight unit entirely devoid of pipe connections and power connections. The operation of the device does not depend upon the circulation of fluid refrigerant or the maintenance of a substantial volume of brine, and the device, therefore, is both light in weight and simple to operate. The invention is particularly adapted for embodiment in compact, inexpensive units suitable for use in the home, on board airplanes and other vehicles, in beverage dispensing bars and eating establishments.

Another object of the invention is to provide a quick freezing device of the character above referred to that may be entirely manually operated. While the quick freeze unit may be equipped with a power means, it will in most instances be preferred to design and proportion the device for manual operation. The action is such that but little manual effort is required, and delivery of the frozen product almost immediately follows initiation of the operation. Furthermore, the delivery of the frozen confection or beverage is continuous and in substantial volume so long as simple rotation of a crank or handle is maintained, and so long as the unit is supplied with the liquid mixture.

It is another object of the invention to provide a refrigerating or freezing device of the character referred to that produces a frozen dessert, confection or beverage of fine uniform texture, devoid of lumps and ice crystals. The quick freezing action, and the relationship between the container for the frozen product and the freezing element, assure the formation of a smooth, uniform, fine-textured frozen dessert or beverage.

It is a further object of the invention to provide a quick freezing device in which a thin-walled hollow rotatable drum constitutes a container of maximum capacity for the selected refrigerant, and presents a moving freezing surface which passes through the liquid confection or beverage mixture so that a thin layer of the mixture is instantly frozen thereon for subsequent removal by a blade or scraper knife. The thin wall of the freezing drum provides for the direct conduction of heat between the liquid mixture and the refrigerant, insuring the immediate freezing of the liquid on the surface of the drum to produce a smooth, fine-textured frozen product. The thin freezing wall of the drum moves in close proximity to the receiving tray, which is shaped to substantially conform to the surface whereby the frozen product is maintained at a suitable low temperature to prevent softening, separation and stratifying of the frozen dessert or beverage.

It is another object of the invention to provide a freezing device of the character referred to in which the rotatable freezing drum is adapted to contain a refrigerant in the form of solidified carbon dioxide, and is equipped with va e means to allow the controlled escape of the carbon dioxide gas to maintain an efficient freezing action without the hazard of straining or blowing out the drum as the result of accumulated gas pressure.

A still further object of the invention is to provide a quick freeze device that is simple and inexpensive to manufacture, convenient to load, operate and cleanse. The trays for the liquid mixture and frozen product are both readily accessible for filling and removal, and the freezing drum is easily charged with the selected refrigerant. The several parts of the device are all removable or accessible for cleansing, this being desirable in order to maintain the device in a sterile, sanitary condition.

Other objects and features of the invention will be readily understood from the following detailed description of typical preferred embodiments wherein reference will be made to the accompanying drawings in which:

Figure 1 is a perspective view of a quick freeze unit of the invention with a portion of the case broken away to better illustrate the internal parts;

Figure 2 is a central longitudinal detailed sectional view of the device of Figure 1 with portions of the freezing drum and liquid mixture container appearing in side elevation;

Figure 3 is a transverse detailed sectional view taken as indicated by line 3—3 on Figure 2;

Figure 4 is an end elevation of another form of the invention with portions of the case and tray appearing in vertical cross section;

Figure 5 is a longitudinal detailed sectional view taken as indicated by line 5—5 on Figure 4 with certain parts appearing in side elevation; and, Figure 6 is an enlarged fragmentary detailed sectional view of a portion of the freezing drum of Figures 4 and 5 illustrating the closure and valve means.

The invention may be embodied in devices, taking various forms, and in units designed for the freezing of given confections, beverages, etc. In the following disclosure, I will confine the description to the two typical embodiments illustrated in the drawings, it being understood that the invention is not to be considered as limited or restricted to the specific details herein set forth.

The device of Figures 1, 2 and 3 includes a case 10 for housing the freezing drum 11, the liquid mixture tray 12 and the frozen mixture tray 13. The housing or case 10 may be of any selected material and its construction may vary considerably. The case 10 is such that it may be formed of wood, metal or a suitable plastic. I have found it practical to construct the case 10 of a lower section and upper section. The lower section of the case may be a simple rectangular box-like structure having a closed bottom 14, two ends walls 15 and one side wall 16, the other side wall being omitted to allow free access to the containers or trays 12 and 13. The upper edges of the lower housing section may be flat and horizontal to support the top section. The top section forms a hood or cover for partially enclosing the freezing drum 11. As illustrated, the top section of the case comprises two ends 17, a side wall 18 and a top wall 19 which may be rounded or formed with a sloping side part. A side wall and a portion of the top wall 19 may be omitted or cut away to facilitate easy access to the trays 13 and 14 and to expose the interior of the unit for visible inspection. The top section of the case 10 is readily removable, but is normally held in position on the lower section by one or more suitable latches 20. The engaging edges of the end walls 15 and 17, of the two case sections, are formed with partially cylindrical notches which register to constitute cylindrical openings 21 for receiving the trunnions or bearings of the drum 11. The opening 21 in one end of the case 10 is enlarged in diameter to receive the filling neck 22 of the freezing drum 11, as will be later described. It will be observed that the case 10 is of simple construction and that its two sections may be readily constructed as one-piece metal stampings or castings of metal or plastic.

The drum 11 is the freezing element of the device, serving to contain a selected refrigerant and presenting the freezing surface for solidifying the ice cream, confection or beverage mixture. The drum 11 is preferably a hollow cylindrical horizontally arranged element having a thin side wall 23, a closed head or end 24, and an end 25 provided with the tubular filling neck 22. It is preferred to construct the drum 11 of a suitable plated sheet metal or corrosion resistant metal so that the freezing wall 23 may be thin for efficient heat transference, and whereby the drum has a high heat conduction coefficient. The drum 11 is proportioned to operate freely within the case 10 and is supported for rotation about its longitudinal axis. The closed end 24 of the drum carries a central trunnion 26 equipped with a suitable bushing or bearing 27 for operating in the small opening 21 of the case 10. The tubular filling neck 22 is provided to facilitate the introduction of the solid refrigerant into the drum, being sufficiently large in diameter to admit lumps or bodies of ice and dry ice of substantial size. The neck 22 carries a bearing 28 for operating in the large opening 21 of the case 10. The bearings 27 and 28 are preferably constructed to have end thrust engagement with the end walls of the case and to suitably space the drum 11 from the case walls. The filler neck 22 is of sufficient length to project beyond the end of the case 10 and the operating means of the drum is associated with its protruding portion. The operating means may be a suitable lever or crank 29 carried by a ring 30, which in turn is secured to the filler neck 22.

It is contemplated that any selected refrigerant may be used in the drum 11 to effect the refrigerating or freezing action. For example, the drum may be packed with ice and ice cream salt, or may be supplied with dry ice or carbon dioxide. It is preferred to substantially fill the drum 11 with the refrigerant to obtain the maximum refrigerating or freezing effect. Upon removing the case top, the drum 11 is removable from the case for convenient packing with the selected refrigerant.

The invention includes a pressure relief valve means for controlling the mouth of the filler neck 22. This means serves to permit the escape of the carbon dioxide gas, when dry ice is employed as the refrigerant, and prevents the loss of the solid refrigerant bodies. The valve means includes a bridge or web 31 extending across the inner end of the opening in the filler neck 22 and a stem 32 attached to the web and extending outwardly through the neck. A flexible resilient disc or valve member 33 is arranged against the forward end of the neck 22 and has a central opening passing the stem 32. The closure or valve 33 may be formed of rubber or a suitable synthetic rubber composition. A washer 34 is arranged on the stem 32 to engage against the outer face of the valve 33 and a thumb nut or wing nut 35 is screw threaded on the stem 32 behind the washer to removably secure the valve in its operative position. The resilient closure or valve 33 normally remains in the closed position where it seals against the end surface of the filler neck 22 to prevent the passage of the solid or liquefied refrigerant from the drum 11, but is adapted to yield under internal gas pressure to permit the escape of such pressure. Upon removing the wing nut 35, the valve 33 may be detached to permit ready filling and emptying of the freezing drum 11. If desirable, the web 31 and stem 32 may be removed by cocking the assembly in the neck 22 during the removing operation.

The tray 12 is provided to contain the liquid mixture to be frozen or solidified. The tray 12 is adapted to be supplied with an ice cream mixture, a sherbet mixture or other dessert or confection mixture, or may contain an alcoholic beverage mixture, or a soft drink mixture suitable for freezing. In this embodiment of the invention the tray 12 is removably arranged in the lower part of the case 10 in a position where the peripheral portion of the freezing drum 11 may rotate through its contents. The tray 12 is introduced through the open side of the case 10 and is preferably positioned so that its supply of the liquid mixture may be replenished from time to time without the necessity of removing the tray from the case. The bottom wall 14 of the case may be built up as at 37 to support the tray 12 in the desired position. The tray 12 is of sufficient length to fully receive the lower portion of the drum 11 and is of ample depth to contain a suitable supply of the liquid mixture. The inner wall 38 of the tray 12 is curved upwardly and inwardly in substantial conformance to the cylindrical freezing surface of the drum 11 as best illustrated in Figure 3. The spacing of the curved wall 38 from the freezing surface of the drum 11 is such that a desirable thin film of the frozen product may pass out of the tray on the surface of the drum 11, but the liquid contents of the tray are prevented from being carried over the lip of the tray.

The tray 13 is provided to receive the ice cream, frozen beverage or other frozen product from the surface of the freezing drum 11. The receiving tray 13 is an elongated pan-like container extending the full length of the drum 11 and arranged in the case 10 above the liquid mixture supply tray 12. It is preferred to removably mount the tray 13 in the open face or side of the case 10. In the drawings I have shown pins 40 on the side walls 17 of the case top, and hooks 41 on the ends of the tray for engaging the pins to removably support the tray, it being understood that other appropriate means may be employed to support and retain the tray in the required position. The inner wall 42 of the tray 13 is concave and cylindrically curved to substantially conform to the freezing surface of the drum 11, and the tray is positioned so that this conforming wall is in close relation to the drum surface. This assures an effective heat transferring relationship between the freezing drum and the tray 13 so that the frozen product received in the tray is maintained in the frozen condition.

The above described tray 13 carries a scraper or blade 43 for removing the film of frozen material from the freezing surface of the drum 11 as the same rotates. The blade 43 extends throughout the length of the drum 11 and inclines upwardly and toward the drum, presenting a rather sharp upper edge for substantially entirely removing the frozen film from the drum surface. The blade 43 is secured to the inner wall 42 of the tray 13 and is positioned so that the frozen product or material is directed into the tray as it is shaved from the drum. The blade 43 may be formed as an integral part of the inner wall 42, if desired for production reasons. It may be found desirable to omit one end wall of the tray 14 so that upon removal from the case 10, the frozen dessert or beverage may be quickly and readily pushed out through the open tray end.

It is believed that the operation of the quick freeze unit illustrated in Figures 1, 2 and 3 will be readily apparent from the foregoing detailed description. In preparing the device for use the freezing drum 11 is removed from the case and is supplied with ice and salt or with dry ice. It is preferred to substantially fill the drum 11 with the selected refrigerant. The valve 33 is applied to the neck 22 of the drum and is adjusted to the operative position by the wing nut 35. The tray 12 is supplied with a suitable quantity of the liquid mixture which is to form the frozen dessert, confection or beverage, and the drum is arranged in position in the case 10. Upon reapplying the cover of the case 10 and installing the tray 13, the device is in condition for operation.

In operating the freezing unit, the handle or lever 29 is manually manipulated to rotate the freezing drum 11 in the direction indicated by the arrow in Figure 3. Upon such rotation of the drum its freezing surface moves into, through and then out of the body of liquid mixture in the tray 12. During this movement, a thin layer or film of the mixture freezes onto the drum surface and is carried around with the drum to the blade 43. The blade shears or removes the frozen layer from the drum 11 and the thin shavings or layers of the frozen product fall into the receiving tray 13.

The thin wall of the drum 11, moving through the liquid in the supply tray 12, provides for the direct transfer of heat from the liquid to the refrigerant and assures a rapid, almost instantaneous freezing of the layer on the surface of the drum. This quick freezing action, coupled with the scraping or shaving action of the blade 43 produces a smooth, fine-textured frozen product devoid of lumps and ice crystals. Thus, simple rotation of the drum 11 results in the production of a smooth, fine-grained frozen material. The speed of rotation of the drum may be relatively slow but will depend to a large degree upon the character and viscosity of the liquid mixture. The operation may be continued until the desired quantity of the product has been formed. The supply of the liquid mixture is easily replenished and the tray 13 may be readily removed from time to time for emptying.

The freezing unit illustrated in Figures 4, 5, and 6 comprises a case 50, a freezing drum 11 rotatable in the case and a receiving tray 13. The drum 11 and the receiving tray 13 may be substantially the same as in the preceding form of the invention, and corresponding reference numerals are applied to corresponding parts of these elements.

The case 50 is divided in a central horizontal plane into a lower section and a top section. The lower section has a suitable base 52 and vertical end walls 53. A trough-like partition or wall extends between the end walls 52 and curves downwardly and inwardly from the opposite sides of the case to form the container 51 for the liquid mixture. The lower portion of the container 51 may be curved in substantially concentric relation to the rotatable freezing drum 11. The front side portion of the container 51 extends outwardly to form a receiving hopper for the liquid to be frozen. The opposite side portion of the container 51 may likewise be projected to some extent to form a back feed trough so that the liquid will not be thrown or carried out of the container by the rotating drum. The top section of the case 50 has vertical end walls 54, the lower edges of which rest upon the upper edges of the lower case section. These engaging edges have notches which register to form openings 55 for receiving the bearings of the freezing drum 11. The opening 55 which receives the throat or neck 56 of the drum is of substantial diameter. The major wall portion of the top case section is curved to be substantially concentric with the rotatable freezing drum 11. The two case sections may be releasably latched together as in the above described form of the invention. It is to be observed that the case sections may be simple integral plastic members, metal castings, die castings or sheet metal units.

The freezing drum 11 is removably supported in the case 50 for rotation about a horizontal axis. The small trunnion or bearing 27 of the drum 11 is rotatably engaged in the small opening 55 of the case 50 and a tubular sleeve or collar 57 is secured to the neck 56 of the drum to rotate in the larger opening 55. A ring 58 is secured to the outer end of the collar 57 as by welding, and carries the operating crank or lever 59. The end of the collar 57 and the ring 58 are shaped or flanged to define an internal annular groove 60.

This form of the invention includes a particularly effective removable valved closure for the filling neck of the freezing drum 11. The closure means includes a pair of flexible resilient metal discs 61. The discs 61 are partially spherical and are arranged with their concave sides in opposing relation to form a bellows-like unit. The peripheral portions of the flexible discs 61 are secured together by spot welding or other appropriate means. The peripheral parts of the discs 61 are shaped or flanged to define an annular groove 62 carrying a ring 63 of rubber, synthetic rubber or other suitable sealing means. The ring 63 projects beyond the discs 61 and is adapted to engage in the above mentioned groove 60.

A tubular stem 64 passes through central openings in the flexible discs 61 and has a head 65 on its inner end secured to or bearing against the inner surface of the inner disc. A wing nut 66 is screw threaded on the projecting outer portion of the stem 64 for cooperation with the outer disc 61. When the nut 66 is freed or backed off, the discs 61 expand axially and contact radially, reducing the effective diameter of the sealing ring 63 so that it may be readily passed into the mouth of the filling opening of the drum 11. When the plug or closure has been properly positioned, the nut 66 is tightened down. This causes the discs 61 to contract axially and expand radially so that the ring 63 is expanded into the groove 60, removably locking and sealing the closure in the filling opening of the freezing drum 11. To remove the plug or closure, it is only necessary to back off the nut 66 so that the resilient discs 61 may expand axially and contract radially. The radial contraction of the discs 61 frees the ring 63 from the groove 60 and allows the closure to be withdrawn.

The expansible and contractable closure means just described carries valve means or pressure relief means for allowing the escape of gas pressure from the drum 11 in the event carbon dioxide is utilized as the refrigerant. The valve means includes an annular outwardly facing valve seat 67 in the tubular stem 64 and a ball valve 68 for sealing inwardly against the seat. A compression spring 69 normally urges the ball 68 against its seat 67. When a given gas pressure develops within the drum 11, as a result of employing carbon dioxide as the refrigerant, the valve 68 is unseated and the excess pressure is allowed to escape from the drum.

The tray 13 for receiving the frozen dessert, beverage or other product, may be supported from the top section of the case 50 by the pins 40 and hooks 41 so as to be in the open side of the case above the container 51. The receiving container 13 has the curved inner wall conforming to the freezing surface of the drum 11 and is equipped with the blade 43 as described above.

The operation of the freezing unit shown in Figures 4, 5 and 6 is the same as previously described. However, in this form of the invention, the closure and pressure relief valve assembly for the freezing drum 11 is readily removable as a unit to facilitate filling and emptying of the drum, and where the container 51 is constructed as an integral part of the lower case section, there is one less part to handle, install and cleanse.

From the above it will be seen that I have provided a simple, compact, light-weight device for making ice creams, sherbets, frozen beverages, etc. The unit is easy to operate and requires no power drive means. The characteristics of light weight and compactness make the unit portable and well suited for use in the home, on board aircraft, in cocktail bars, eating establishments, etc.

Having described only typical forms of the invention, I do not wish to be limited to the specific details herein set forth, but wish to reserve to myself any variations or modifications that may appear to those skilled in the art or fall within the scope of the following claims.

I claim:

1. A quick freeze device comprising a rotatable refrigerant-containing freezing drum, means for supplying liquid to the surface of the drum, a receiving container having a wall substantially conforming to said surface and arranged in close proximity thereto, to be in heat transfer relation thereto, and means above said wall for removing the frozen liquid from said surface so that it enters the receiving container.

2. A device of the character described comprising a case, means in the case for containing a liquid, a hollow freezing drum for containing a solidified, normally gaseous refrigerant, trunnions on the drum for rotatably supporting the drum in the case to have its peripheral surface move through the liquid in said means so that a film of the liquid freezes on the rotating surface, one of said trunnions being tubular to constitute the filling means for the drum, closure means for said tubular trunnion operable to allow the escape of gas under pressure from the drum through said last mentioned trunnion, and means for removing said film from the drum during rotation of the same.

3. A quick freeze device comprising a rotatable refrigerant-containing freezing drum, means for supplying liquid to the surface of the drum to freeze thereon during rotation of the drum, a receiving container having a wall conforming to and in close proximity to said surface of the drum to be in heat-transfer relation thereto, and a blade above said wall for removing the frozen liquid from said surface to enter the receiving container.

4. A device of the character described comprising a case, means in the case for containing a liquid, a hollow freezing drum for containing a solidified, normally-gaseous refrigerant, means for rotatably supporting the drum in the case to have its peripheral surface move through the liquid in the first named means to cause a film of liquid to freeze on the rotating surface, the second named means comprising a tubular trunnion on the drum for bearing in the case and forming the filling neck of the drum, and a closure for sealing against the end of the tubular trunnion and yieldable under internal pressure to relieve the drum of such pressure by permitting the escape of gas through said trunnion, and means for removing said film from the drum.

5. A device of the character described comprising a case, means in the case for containing a liquid, a hollow freezing drum for containing a solid, normally-gaseous refrigerant, trunnions on the drum for rotatably supporting the drum in the case to have its peripheral surface move through the liquid in said means so that a film of the liquid freezes on the rotating surface, one of said trunnions being tubular to constitute the filling means for the drum, closure means for said tubular trunnion operable to allow the escape of gas under pressure from the drum through said tubular trunnion, the closure means including a flexible resilient member for engaging against the end of the tubular trunnion and removable means for holding the member against said end of the tubular trunnion, and means for removing said film from the drum during rotation of the same.

6. A device of the character described comprising a drum for containing a solid refrigerant, the drum having an opening for admitting the refrigerant, an expansible closure for insertion in said opening, means for expanding the closure in the opening, means supporting the drum for rotation, means for supplying liquid to the exterior of the rotatable drum to freeze thereon, and means for shaving the frozen liquid from the drum as it rotates.

7. A device of the character described comprising a drum for containing a solid refrigerant, the drum having an opening for admitting the refrigerant, a radially expansible bellows-like closure for insertion in the opening, means for compressing the closure axially to cause it to expand radially in the opening, means supporting the drum for rotation, means for supplying liquid to the exterior of the rotating drum to freeze as a film thereon, and means for shaving said film from the drum as it rotates.

8. A quick freeze device comprising a case having an open side, a liquid container in the case, a refrigerant-containing drum rotatably supported in the case and having a cylindrically curved external surface which moves through the liquid in the container when the drum is rotated so that a film of the liquid freezes thereon, means for rotating the drum, a receiving container insertable and removable through said open side of the case, the receiving container having a cylindrically curved wall for conforming to said surface of the drum, means for removably supporting the receiving container in the case to be visible and accessible through said open side of the case and to be in a position where its said curved wall is in close conforming proximity to said surface of the drum whereby the receiving container is in heat-transfer relation to the refrigerant-containing drum, and a blade extending along the upper edge of said curved wall of the receiving container for shaving the frozen liquid film from said surface of the drum to pass directly into the receiving container.

9. A device of the character described comprising a drum, means for rotatably supporting said drum, said drum having an opening in an end wall through which a refrigerant may be introduced, a closure which is insertable into said opening, said closure including a sealing ring, cooperating members which engage opposite sides of said ring and an element for forcing said members together to expand said ring radially and in so doing cause it to close said opening, means for supplying liquid to the exterior of said drum so that it will freeze thereon, and means for shaving the frozen liquid off said drum.

10. A device of the character described comprising a drum, means for rotatably supporting said drum, said drum having an axially extending neck through which a refrigerant may be introduced, a closure which is insertable into said neck, said closure including a sealing ring, cooperating members which engage opposite sides of said ring and an axially-extending, threaded element for forcing said members together to expand said ring radially and in so doing cause it to close said neck, means for supplying liquid to the exterior of said drum so that it will freeze thereon, and means for shaving the frozen liquid off said drum.

11. A device of the character described comprising a casing formed by a base section and a cover section, the sides of said sections having aligned openings formed therein, a drum rotatably supported in said casing by journals which occupy said openings, one of said journals being in the form of a neck which is open at the end and through which a refrigerant may be introduced into the drum, a removable closure which is insertable into said neck, said closure including a sealing ring, cooperating members which engage opposite sides of said ring and an element which is operable to force said members together to expand said ring radially and in so doing close said neck, a crank connected to said neck for rotating said drum, means for supplying liquid to the exterior of said drum so that it will be frozen thereon, a blade for shaving the frozen liquid from said drum, and a receptacle into which the frozen liquid is directed as it is removed from said drum.

LYLE J. CASMIRE.

REFERENCES CITED

The following references are of record in the file of this patent:

UNITED STATES PATENTS

| Number | Name | Date |
|---|---|---|
| 491,104 | Hart | Feb. 7, 1893 |
| 1,951,679 | Sherrick | Mar. 20, 1934 |
| 1,975,177 | Sherrick | Oct. 2, 1934 |
| 2,073,176 | Quinn | Mar. 9, 1937 |
| 2,095,847 | Willat | Oct. 12, 1937 |
| 2,214,312 | Stovall | Sept. 10, 1940 |

FOREIGN PATENTS

| Number | Country | Date |
|---|---|---|
| 294,649 | Italy | Mar. 31, 1942 |